(12) United States Patent
Han et al.

(10) Patent No.: US 11,359,932 B2
(45) Date of Patent: *Jun. 14, 2022

(54) VEHICLE CAMERA CALIBRATION SYSTEM (71) Applicant: TUSIMPLE, INC., San Diego, CA (US)

(72) Inventors: Xiaoling Han, San Diego, CA (US); Zehua Huang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,551

(22) Filed: Oct. 28, 2020

(65) Prior Publication Data
US 2021/0080286 A1 Mar. 18, 2021

Related U.S. Application Data (63) Continuation of application No. 16/572,001, filed on Sep. 16, 2019, now Pat. No. 10,837,795.

(51) Int. Cl.
G01C 25/00 (2006.01)
G01C 11/04 (2006.01)
(Continued)

(52) U.S. Cl.
CPC .............. G01C 25/00 (2013.01); G01C 9/06 (2013.01); G01C 11/04 (2013.01); G01S 7/4808 (2013.01);
(Continued)

(58) Field of Classification Search
CPC .......... G01C 25/00; G01C 9/06; G01C 11/04; G06T 7/80; G01S 17/931; G01S 17/10;
(Continued)

(56) References Cited

U.S. PATENT DOCUMENTS 6,963,657 B1    11/2005  Nishigaki et al.
2014/0293266 A1*  10/2014  Hsu ..................... G01S 17/36
                                                  356/5.01
(Continued)

OTHER PUBLICATIONS

Han, X. et al., "Vehicle Camera Calibration System," U.S. Appl. No. 16/572,001, filed Sep. 16, 2019, 31 pages.

*Primary Examiner* — John W Miller
*Assistant Examiner* — Sean N. Haiem
(74) *Attorney, Agent, or Firm* — Paul Liu; Julie J. Muyco; Baker Botts, LLP (57) ABSTRACT Technique for performing camera calibration on a vehicle is disclosed. A method of performing camera calibration includes emitting, by a laser emitter located on a vehicle and pointed towards a road, a first laser pulse group towards a first location on a road and a second laser pulse group towards a second location on the road, where each laser pulse group includes one or more laser spots. For each laser pulse group: a first set of distances are calculated from a location of a laser receiver to the one or more laser spots, and a second set of distances are determined from an image obtained from a camera, where the second set of distances are from a location of the camera to the one or more laser spots. The method also includes determining two camera calibration parameters of the camera by solving two equations.

20 Claims, 6 Drawing Sheets (51) Int. Cl.
  *G01S 17/10* (2020.01)
  *G01S 7/48* (2006.01)
  *G01C 9/06* (2006.01)
  *G06T 7/80* (2017.01)
  *H04N 17/00* (2006.01)
  *G01S 7/4865* (2020.01)
  *G01S 17/931* (2020.01)
  *G01S 17/46* (2006.01)
  *G01S 17/42* (2006.01)
  *G01S 17/48* (2006.01)
  *G01S 17/89* (2020.01)

(52) U.S. Cl.
  CPC ............ *G01S 7/4865* (2013.01); *G01S 17/10* (2013.01); *G01S 17/42* (2013.01); *G01S 17/46* (2013.01); *G01S 17/48* (2013.01); *G01S 17/89* (2013.01); *G01S 17/931* (2020.01); *G06T 7/80* (2017.01); *H04N 17/002* (2013.01); *G01C 2009/066* (2013.01)

(58) Field of Classification Search
  CPC .......... G01S 17/48; G01S 17/46; G01S 17/89; G01S 17/42; G01S 7/4808; G01S 7/4865; H04N 17/002

USPC .................................. 348/187, 148; 382/106
  See application file for complete search history.

(56) References Cited

U.S. PATENT DOCUMENTS

| | | |
|---|---|---|
| 2016/0034771 A1 | 2/2016 | Schamp |
| 2016/0035096 A1* | 2/2016 | Rudow .................. H04N 5/44 348/135 |
| 2016/0309140 A1 | 10/2016 | Wang et al. |
| 2017/0122731 A1 | 5/2017 | You et al. |
| 2019/0004178 A1 | 1/2019 | Motoyama et al. |
| 2019/0098221 A1 | 3/2019 | Troy et al. |
| 2019/0258251 A1* | 8/2019 | Ditty .................. G06K 9/00805 |
| 2019/0265703 A1* | 8/2019 | Hicok .................. G06Q 50/30 |
| 2019/0370565 A1 | 12/2019 | Shen et al. |
| 2019/0391244 A1 | 12/2019 | Sekiguchi et al. |
| 2020/0025929 A1* | 1/2020 | Kirillov ................ G01S 7/4815 |
| 2020/0081121 A1 | 3/2020 | Singhal et al. |

\* cited by examiner

VEHICLE CAMERA CALIBRATION SYSTEM

CROSS-REFERENCE TO RELATED APPLICATION

This application is a continuation of U.S. patent application Ser. No. 16/572,001 filed Sep. 16, 2019, by Xiaoling Han et al., and entitled "VEHICLE CAMERA CALIBRATION SYSTEM," which is incorporated herein by reference.

TECHNICAL FIELD

This document describes techniques to perform camera calibration in a vehicle.

BACKGROUND

A vehicle may include cameras attached to the vehicle for several purposes. For example, cameras may be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the vehicle. For example, images obtained by a camera can be analyzed to determine distances of objects surrounding the autonomous vehicle so that the autonomous vehicle can be safely maneuvered around the objects.

SUMMARY

Camera calibration techniques are described to determine slope and intercept values for cameras on a vehicle. In an exemplary embodiment, a method of performing camera calibration includes emitting, by a laser emitter located on a vehicle and pointed towards a road at a first angle, a first laser pulse group towards a first location on a road, emitting, by the laser emitter pointed towards the road at a second angle, a second laser pulse group towards a second location on the road, where each of the first laser pulse group and the second laser pulse group comprises one or more laser spots. For each of the first laser pulse group and the second laser pulse group emitted at the first location and the second location, respectively, the method further includes detecting, by a laser receiver located on the vehicle, the one or more laser spots, calculating a first set of distances from a location of the laser receiver to the one or more laser spots, obtaining, from a camera located on the vehicle, an image comprising the one or more laser spots, and determining, from the image, a second set of distances from a location of the camera to the one or more laser spots. The method further includes determining two camera calibration parameters of the camera by solving two equations, where each equation includes two unknown camera calibration parameters, and a first value associated with the first set of distances and a second value associated with the second set of distances for a same laser pulse group.

In some embodiments, the determining the two camera calibration parameters comprises determining a slope value and an intercept value by: determining, for both the first laser pulse group and the second laser pulse group, a first average distance of the first set of distances and a second average distance of the second set of distances, where the first value is the first average distance and the second value is the second average distance, and determining, by solving two linear equations, the slope value and the intercept value with which the camera is calibrated, where a first linear equation includes an unknown slope value, an unknown intercept value, and the first average distance and the second average distance corresponding to the first laser pulse group, and where a second linear equation includes the unknown slope value, the unknown intercept value, and the first average distance and the second average distance corresponding to the second laser pulse group. In some embodiments, the method further comprises determining, while the vehicle is being driven, a location of an object in another image obtained from the camera by using the slope value and intercept value of the camera.

In some embodiments, the first location is located at a first pre-determined distance along the road from a location of the laser emitter, and the second location is located at a second pre-determined distance along the road from the location of the laser emitter. In some embodiments, the first pre-determined distance and the second pre-determined distance are within a range of distances from a location of the camera at which the camera is configured to obtain the images. In some embodiments, the method further comprises: determining the first angle and the second angle formed in between a direction in which the laser emitter is pointed towards the road and an imaginary horizontal plane that is at least partly parallel to the road and that includes at least a portion of the laser emitter, and adjusting the laser emitter according to each of first angle and the second angle to emit the first laser pulse group and the second laser pulse group at the first pre-determined distance and the second pre-determined distance, respectively. In some embodiments, each of first pre-determined distance and the second pre-determined distance is a distance from the location of the laser emitter to at least one laser spot of the one or more laser spots.

In some embodiments, each of the first laser pulse group and the second laser pulse group is emitted for a pre-determined time duration. In some embodiments, the pre-determined time duration is greater than a reciprocal of a frame rate of the camera.

In some embodiments, the detecting the one or more laser spots and the calculating the first set of distances comprises: receiving, from the laser receiver, signals indicative of times when the one or more laser spots are detected, calculating, for each laser spot, a distance from the laser receiver to a laser spot by: obtaining a time delay value by subtracting a first time of detection of the laser spot from a second time when a laser pulse group that included the one or more laser spots was emitted, and multiplying the time delay value by one-half of a speed of light.

In some embodiments, the first laser pulse group and the second laser pulse group are emitted when the vehicle is stopped or parked on the road. In some embodiments, the camera is located adjacent to the laser receiver.

In another exemplary aspect, the above-described methods are embodied in the form of processor-executable code and stored in a computer-readable program medium. The computer readable program is stored on a non-transitory computer readable media, the computer readable program including code that when executed by a processor, causes the processor to implement the methods described in this patent document. For example, the computer readable program including code that when executed by a processor, causes the processor to: instruct a laser emitter located on a vehicle to point towards a road at a first angle and emit a first laser pulse group towards a first location on a road, instruct the laser emitter to point towards the road at a second angle and emit a second laser pulse group towards a second location on the road, where each of the first laser pulse group and the second laser pulse group comprises a one or more laser spots. For each of the first laser pulse group and the second laser pulse group emitted at the first location and the second location, respectively, the computer readable program when executed by the processor further causes the processor to detect, by a laser receiver located on the vehicle, the one or more laser spots, calculate a first set of distances from a location of the laser receiver to the one or more laser spots, obtain, from a camera located on the vehicle, an image comprising the one or more laser spots, and determine, from the image, a second set of distances from a location of the camera to the one or more laser spots. The computer readable program when executed by the processor further causes the processor to determine two camera calibration parameters of the camera by solving two equations, where each equation includes two unknown camera calibration parameters, and a first value associated with the first set of distances and a second value associated with the second set of distances for a same laser pulse group.

In yet another exemplary embodiment, a device that is configured or operable to perform the above-described methods is disclosed.

In another aspect, a vehicle fitted with a camera calibration apparatus is disclosed.

The above and other aspects and their implementations are described in greater detail in the drawings, the descriptions, and the claims.

DETAILED DESCRIPTION

An autonomous vehicle includes cameras mounted on the autonomous vehicle to obtain images of one or more areas surrounding the autonomous vehicle. These images can be analyzed by a computer on-board the autonomous vehicle to obtain distance or other information about the road or about the objects surrounding the autonomous vehicle. However, the cameras on the autonomous vehicle need to be calibrated so that the computer on-board the autonomous vehicle can precisely or accurately detect an object and determine its distance. In a conventional system, a driver in an autonomous vehicle can perform a static calibration technique before the autonomous vehicle is driven to its destination.

Figure 1:
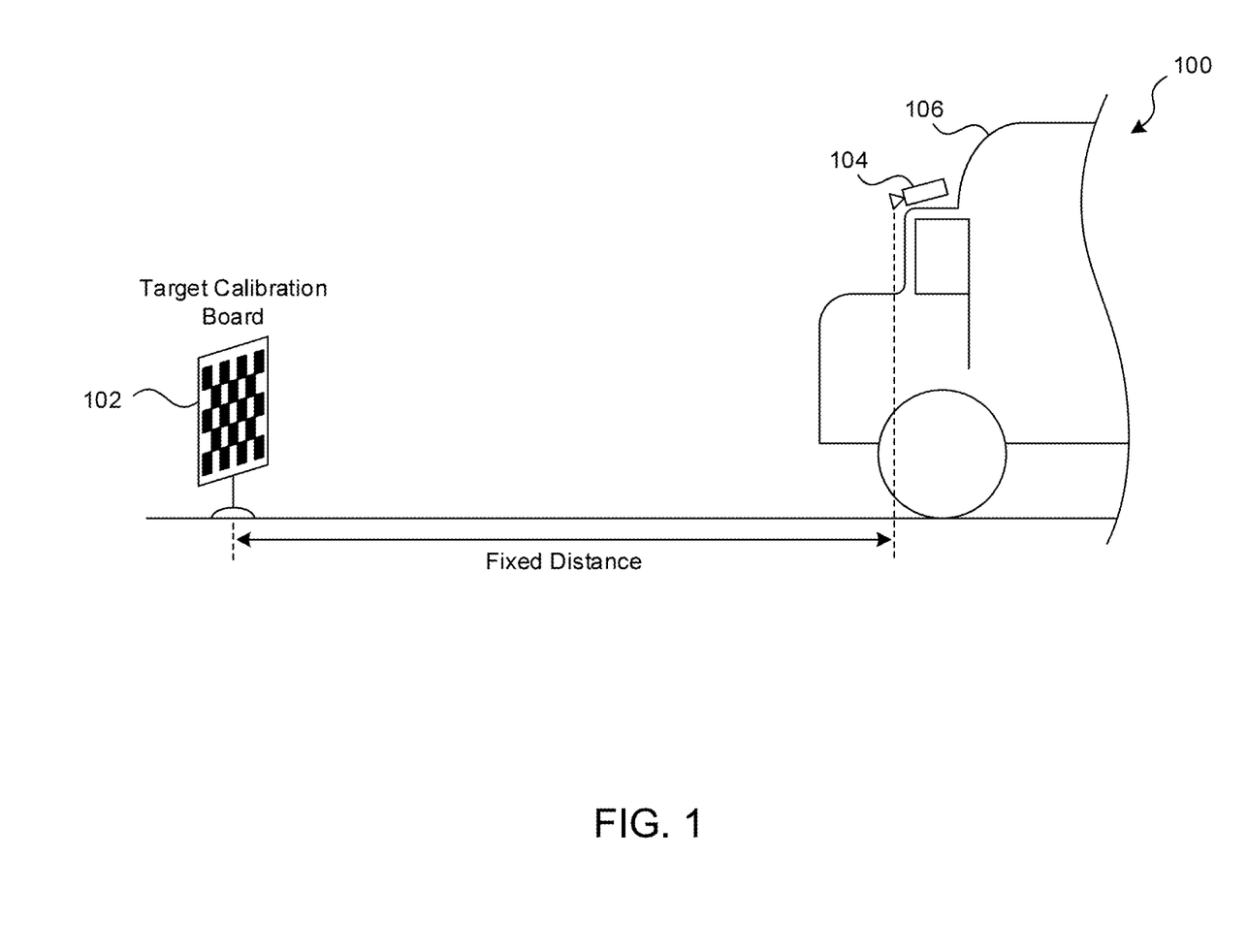
FIG. 1 shows a conventional system to perform a static calibration operation with a camera on a vehicle.

FIG. 1 shows a conventional system 100 to perform a static calibration operation with a camera on a vehicle. In the conventional system 100, a vehicle 106 is first driven to a location where a target calibration board 102 is located. The target calibration board 102 has a pre-defined pattern of black and white squares. Furthermore, the target calibration board 102 is located at a fixed distance from the vehicle 106 so that the distance from the camera 104 and the target calibration board 102 is fixed. The fixed distance is set according to the focal length of the camera. The camera 104 can take several pictures of the target calibration board 102. The computer on-board the vehicle 106 can use space geometry relation to calculate the distance between the target calibration board 102 and the camera 104. The computer on-board the vehicle 106 can adjust the slope and intercept calibration parameters to compensate for differences between the known fixed distance and the calculated distance. After the calibration is performed, the vehicle 106 can be driven to its destination.

The conventional system 100 described in FIG. 1 has several technical drawbacks. First, the slope and intercept values obtained from the calibration process can become inaccurate as the vehicle is driven towards its destination. For instance, when a vehicle is driven towards its destination, a camera's position can change in response to vibrations from the vehicle or in response to forces exerted by environmental elements (e.g., wind). However, in a conventional system 100, the slope and intercept values cannot be easily re-adjusted.

Second, a conventional system cannot easily perform the calibration process that should be performed periodically (e.g., daily, weekly or monthly) to re-adjust the camera's slope and intercept values. Third, the calibration process performed by a convention system may not account for a condition of the road on which as the vehicle will be driven towards its destination. For example, a conventional system may perform a calibration process on a flat surface, but the vehicle may have a different pitch angle as it is driven uphill or downhill to its destination. A different pitch angle of the truck can affect the calibration result and thus affect the distance measurements derived from images obtained by a camera. The techniques described in the present document may be used by some embodiments to solve the above-discuss problems, and others.

This patent document describes exemplary camera calibration techniques to determine camera calibration parameters for a camera. In an exemplary embodiment, a laser emitter on a vehicle emits towards a road a first laser pulse group and a second laser pulse group, where each laser pulse group includes one or more laser spots. The first laser pulse group is emitted at a first distance along or parallel to the road from the location of the laser emitter, and the second laser pulse is emitted at a second distance along or parallel to the road from the location of the laser emitter. For each laser pulse group emitted, a laser receiver on the vehicle can detect the one or more laser spots and a camera on the vehicle can obtain an image of the one or more laser spots. The exemplary calibration technique can determine a first set of distances from the one or more laser spots detected by the laser receiver and a second set of distances from the one or more lase spots in the image obtained by the camera. The exemplary calibration technique can solve for two calibration parameters using two equations, where each equation can include two unknown camera calibration parameters, and both a first average of the first set of distances and a second average of the second set of distances for a same laser pulse group. For example, if the real distance of a laser spot determined from a laser receiver may be 10 meters, 20 meters, 30 meters, 50 meters, and 100 meters but the measured distance determined based on images obtained from a camera may be 8 meters, 19 meters, 31 meters, 52 meters, and 105 meters, respectively, then the techniques described in this patent document can perform a regression to determine the slope and intercept calibration parameters between measured distance and real distance.

Figure 2A:
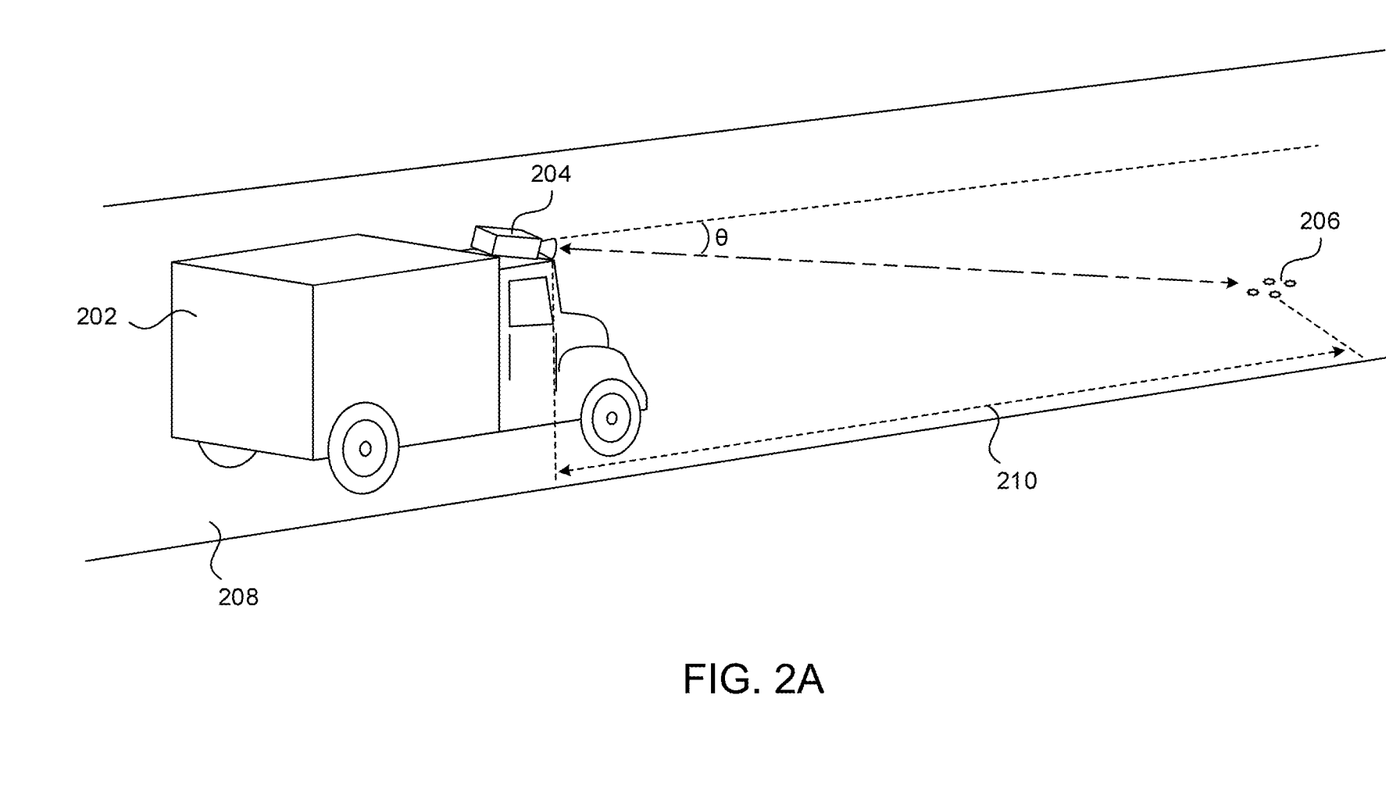
FIG. 2A shows an exemplary camera calibration system.
Figure 2B:
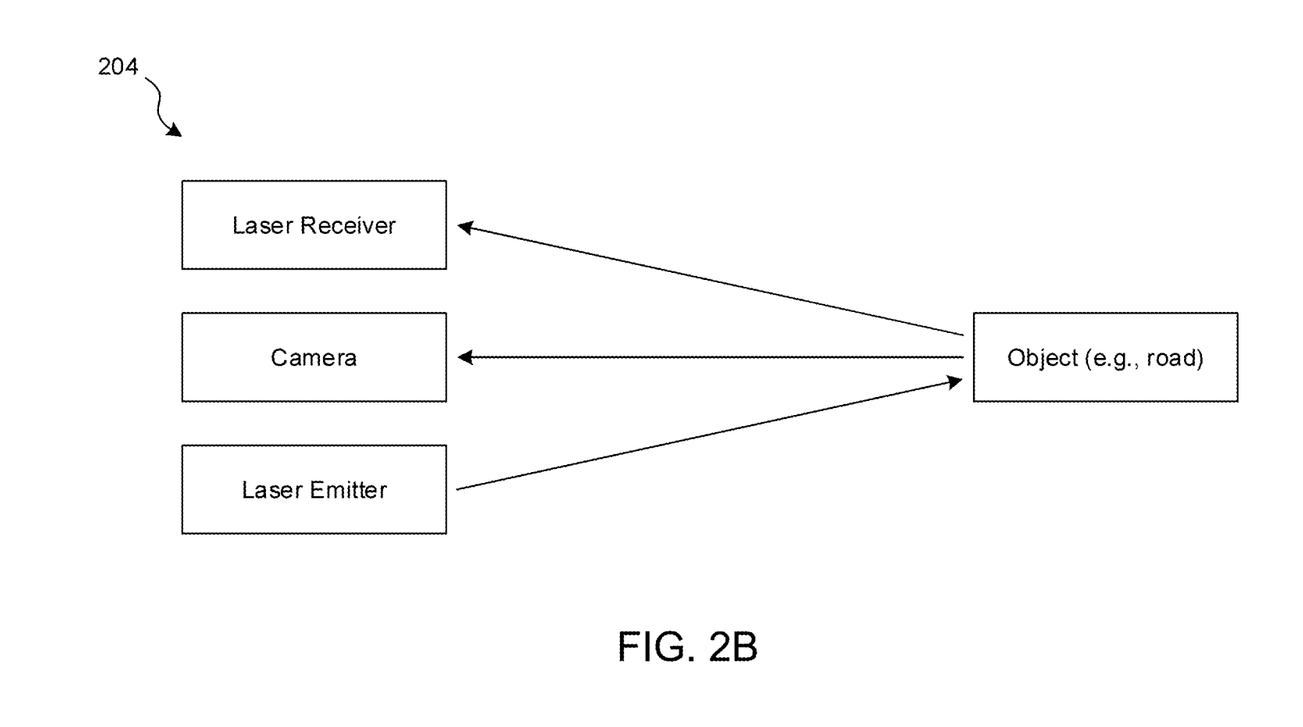
FIG. 2B shows an exemplary camera and laser system that includes a camera, a laser emitter, and a laser receiver.

FIG. 2A shows an exemplary camera calibration system 200 that includes a vehicle 202 stopped or parked on a road 208, where the vehicle 202 includes a camera and laser system 204. The vehicle 202 can be an autonomous vehicle. The camera and laser system 204 includes at least one laser emitter (or a laser source), one or more camera and one or more laser receivers. Each camera may be adjacent to one of the laser receivers so that the distance measurements obtained from the camera images can be related to the distance measurements obtained from the data provided by the laser receivers, as further explained in this patent document. For example, a camera can be within one-foot of a location of a laser receiver. For ease of description, the camera and laser system 204 in FIGS. 2A and 2B is shown as a single camera with a single laser emitter and a single laser emitter in an integrated unit coupled to the vehicle. In some embodiments, the laser emitter, the one or more cameras, and one or more laser receivers may be separate units coupled to the vehicle.

The laser emitter is pointed towards the road 208 and in the same direction as is one or more cameras and the one or more laser receivers. The laser emitter generates and emits towards a road 208 a laser pulse group that includes a one or more laser spots 206. The direction toward which the laser pulse group is emitted is chosen such that at least one of the spots of the one or more laser spots 206 can be sensed by the one or more laser receivers and imaged or recorded by the one or more cameras as shown in FIG. 2B.

In some embodiments, the laser emitter has an adjustable pitch angle such that it can emit a laser pulse toward a road 208 at multiple pre-determined distances along the road or parallel to the road from the location of the laser emitter for calibrating multiple camera. As shown in FIG. 2A, a pre-determined distance 210 can be defined along the road or parallel to the road from the location of the laser emitter to at least one spot of the one or more laser spots 206. A pitch angle (shown as "0" in FIG. 2A) can be considered an angle formed in between the direction in which the laser emitter is pointing, and an imaginary horizontal plane or horizontal line at least partly parallel to the road and including at least a portion of the laser emitter. In some embodiments, a pitch angle can be considered an angle formed between the direction in which the laser emitter is pointing, and an imaginary vertical plane or vertical line at least partly perpendicular to the road and including at least a portion of the laser emitter.

The adjustable pitch angle can allow the laser emitter to generate and emit a plurality of laser pulse groups at various pre-determined distances from the location of the laser emitter. As further explained herein, a laser pulse group includes one or more laser spots 206, thus the pre-determined distance 210 can be a distance from the laser emitter to at least one laser spot or point of the one or more laser spots 206. For example, a laser emitter can emit laser pulse groups with at least one laser spot or point located at pre-determined distances of 10 meters, 20 meters, 70 meters, 120 meters, 300 meters, and 350 meters from the location of the laser emitter.

In some embodiments, where calibration is performed as the vehicle is moving, the pre-determined distances may be proportional to the speed at which the vehicle is moving. For example, in some embodiments, smaller distances may be used for calibration when the vehicle is moving at a relatively high speed (e.g., above a threshold) because of dangers of making mistakes at near-distances at high speeds. For example, in some embodiments, calibration range may be increased when the vehicle is moving at a faster speed in order to look farther ahead when traveling at higher velocities.

As shown in FIG. 2A, the laser emitter can be installed on the vehicle 202 so that the distance between the laser emitter and the road is fixed or previously known or is a function of the velocity of the vehicle. Thus, at each measurement instance, an in-vehicle control computer located in the vehicle 202 includes a laser emitter module (315 in FIG. 3) that can use a trigonometric function to instruct the laser emitter to adjust the pitch angle and to instruct the laser emitter to emit a laser pulse group at each of two or more pre-determined distances from the location of the laser emitter, where the pre-determined distances are parallel to a road or along the road.

A laser emitter with an adjustable pitch angle is a beneficial technical feature at least because it can allow the exemplary calibration technique (as explained herein) to calibrate multiple cameras that capture images at different range of distances from the location of the vehicle. In some embodiments, laser pulse groups generated and emitted at a set of two or more pre-determined distances are used to calibrate the slope and intercept calibration parameters of each camera. The slope and intercept calibration parameters can be solved by setting up the slope and intercept calibration parameters in a slope-intercept form as shown in Equation (2) below, where the slope parameter corresponds to the slope and the intercept parameter corresponds to the intercept (e.g., distance from the origin where a line or curve or surface intersects a plane or axis). Continuing with the example from above, calibration parameters of a first camera that captures images from 5 meters to 50 meters can be adjusted based on laser pulse groups emitted at distances of 10 meters and 20 meters, calibration parameters of a second camera that captures images from 50 meters to 200 meters can be adjusted based on laser pulse groups emitted at distances of 70 meters and 120 meters, and calibration parameters of a third camera that captures images from 200 meters to 500 meters can be adjusted based on laser pulse groups emitted at distances of 300 meters and 350 meters.

The laser emitter can generate and emit multiple laser pulse groups at multiple pre-determined distance from the location of the laser emitter that is pointed towards a road. Each laser pulse group is emitted towards an object (e.g., road) at a pre-determined distance along the road from the location of the laser emitter. As further explained below, the laser emitter generates and emits a laser pulse group to impinge one or more laser spots upon an expected opaque or reflective object or on a road approximately at each pre-determined distance. By using a laser pulse group having one or more laser spots 206, the in-vehicle control computer in the vehicle 202 can perform filtering operations to minimize the effects of noise, distortion, or lack of detection by the laser receiver and/or camera as they sense or image the one or more laser spots or points of the one or more laser spots 206.

For example, in some embodiments, the laser emitter generates and emits each laser pulse group for a pre-determined time duration to allow a camera and/or a laser receiver sufficient time to detect or capture the one or more laser spots 206. For example, in case that a camera's frame rate is 60 frames per second, then the pre-determined time duration of the laser pulse group emitted by the laser emitter can be greater than a reciprocal of the frame rate (e.g., 1/60 seconds, or approximately 16.67 milliseconds). In some implementations, the pre-determined time duration can be at least 60 milliseconds so that at least three frames of the camera can capture the laser pulse group.

Each laser pulse group may include the same one or more laser spots 206. The one or more laser spots 206 includes several individual laser spots or points. For example, as shown in FIG. 2A, the one or more laser spots 206 includes four laser spots that can be located at four vertices of an imaginary quadrilateral in a spatial laser pattern. As shown in FIG. 2A, the one or more laser spots 206 is emitted toward a road. This is a beneficial technical feature that can eliminate the need to use the target calibration board as described in FIG. 1. Furthermore, the exemplary calibration technique described in this patent document can account for variations in road conditions by generating on the road the one or more laser spots 206.

Figure 2C:
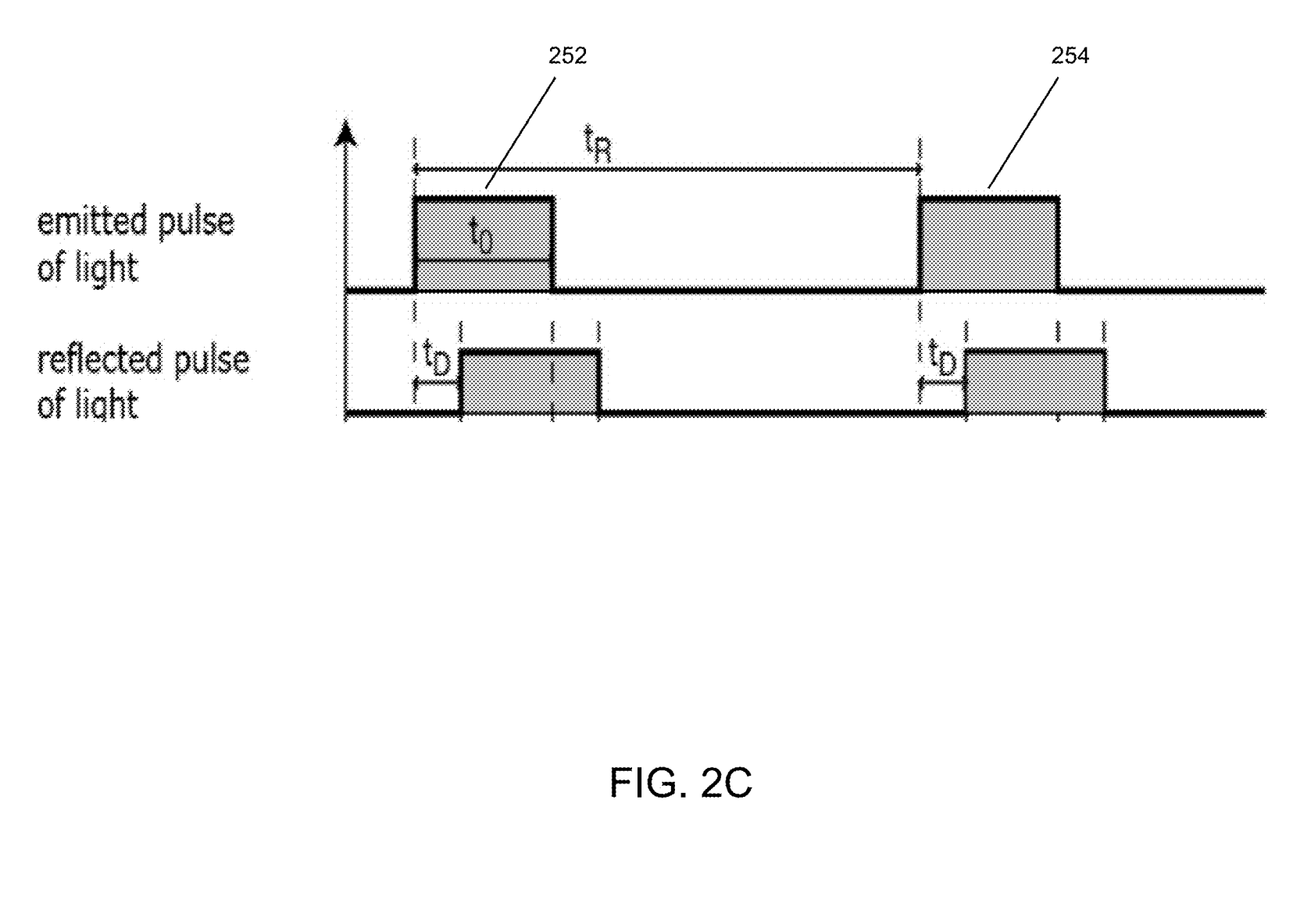
FIG. 2C shows an exemplary two laser pulses generated and emitted by a laser emitter that may be sensed by a laser receiver.

FIG. 2C shows an exemplary two laser pulses generated and emitted by a laser emitter that may be sensed by a laser receiver. For ease of description each laser pulse 252, 254 may be one or more laser spots, and laser pulse 254 is emitted at a time $t_R$ after the emission of laser pulse 252. FIG. 2C shows that each of the first and second pulses 252, 254 are generated to be shone on an object (e.g., a road) for a pre-determined time duration $t_0$. After each laser pulse is generated and emitted by the laser emitter, a laser receiver senses the laser pulse emitted onto the object after a time delay $t_D$. The laser receiver can sense the one or more laser spots and generates signals indicating the times when each of the laser spots or points are detected or sensed by the laser receiver. Referring to the laser pulses 252, 254 in FIG. 2C, the laser receiver sends signals indicative of the times when the laser spots associated with laser pulses 252, 254 are sensed to an in-vehicle control computer as further explained in the calibration related operations in FIGS. 3 and 4.

A laser emitter can generate and emit multiple laser pulse groups comprising one or more laser spots at multiple pre-determined distances along a road from the location of the laser emitter, where the one or more laser receivers can sense one or more laser spots from each laser pulse group. For example, if a laser emitter emits a laser pulse group including four laser spots to be shown at a distance of 10 meters along a road from the location of the laser emitter, then one or more cameras that are configured to capture images from 5 meters to 50 meters and each of the one or more laser receivers adjacent to a camera can sense and/or obtain up to four laser spots from the laser pulse group.

Figure 3:
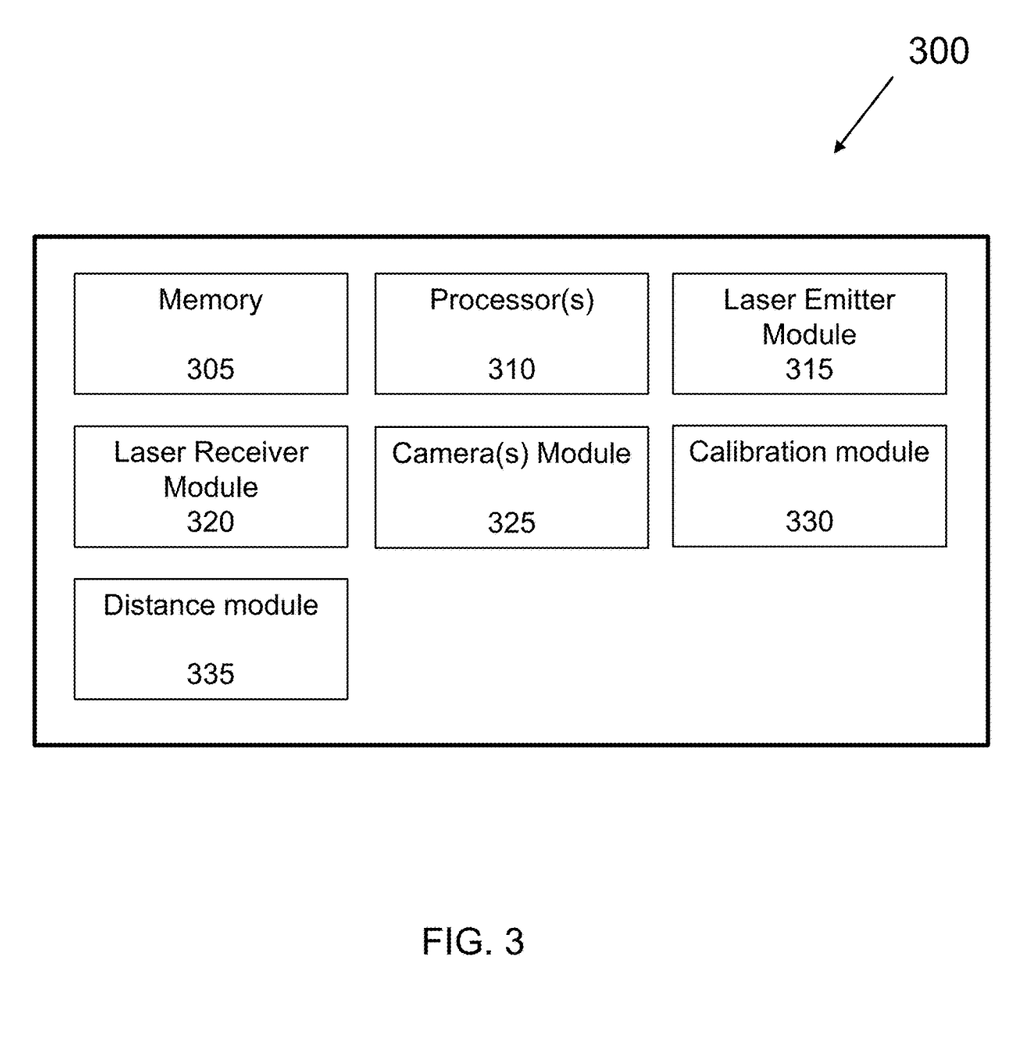
FIG. 3 shows an exemplary block diagram of an in-vehicle control computer located in a vehicle to control the camera and laser system.

FIG. 3 shows an exemplary block diagram of an in-vehicle control computer located in a vehicle to control the camera and laser system as described in FIGS. 2A and 2B. The in-vehicle control computer 300 includes at least one processor 310 and a memory 305 having instructions stored thereupon. The instructions upon execution by the processor 310 configure the computer 300 to perform the operations described for a laser emitter, one or more laser receivers, one or more cameras, and various modules as described in FIGS. 2A to 4, and/or the operations described in the various embodiments or sections in this patent document. The laser emitter module 315 controls the operations of the laser emitter as described in this patent document.

The laser receiver module 320 controls the operations of the one or more laser receivers as described in this patent document. As mentioned above, the laser emitter generates and emits multiple laser pulse groups, where each laser pulse group includes one or more laser spots. The laser receiver module 320 can receive signals from a laser receiver indicative of the time(s) when the one or more laser spots are sensed by the laser receiver as explained in this patent document. The laser receiver module 320 can also obtain from the laser emitter module 315 the plurality of times corresponding to the plurality of emitted laser pulse groups. Based on the signals received from the laser receiver for each detected laser spot and based on the time when a laser pulse is transmitted, the laser receiver module 320 can calculate a distance between the laser receiver and each of one or more detected laser spots based on Equation (1) as shown below:

$$D\_Real = \tfrac{1}{2} * 300{,}000{,}000 \text{ m/s} * t_D \qquad \text{Equation (1)}$$

where $t_D$ for each detected laser spot is the difference in time between when the laser emitter emitted the laser pulse and when the laser receiver detected a laser spot, and where 300,000,000 m/s is a rounded value for the speed of light.

The camera module 325 can process the images received from the one or more cameras to detect the one or more laser spots of each laser pulse group. The in-vehicle control computer stores in a hard drive or memory a set of previous images of one or more laser spots at various pre-determined distances from the location of the laser emitter. These previously storage images can include the one or more laser spots previously obtained from a flat road at various pre-determined distances. The camera module 325 can compare the previously stored one or more laser spots at a pre-determined distance to the images obtained of the one or more laser spots emitted by the laser emitter at the same pre-determined distance. The camera module 325 can determine a distance D_Detect from the camera to one or more laser spots based on the comparison of the stored and obtained images and/or based on the camera matrix.

For each laser pulse group, distances obtained from the laser receiver module 320 for each laser spot can be averaged and the distances obtained from the camera module 325 for each laser spot can be averaged to minimize the effects or distortion or noise or lack of detection. For example, if a laser emitter generates and emits a laser pulse group at a pre-determined distance from the laser emitter where the laser pulse group includes six laser spots, the laser receiver module 320 can average the six distance measurements associated with a six detected spots to obtain a single averaged distance measurement. In the above example, the camera module 320 can also average six distance measurements associated with the six spots in a camera image to obtain a single averaged distance measurement. Thus, for each laser pulse group, the laser receiver module 320 and the camera module 325 can separately calculate a single averaged distance measurement which can be considered a single D_Real value and a single D_Detect value, respectively.

The calibration module 330 can obtain from the laser receiver module 320 and camera module 325 the single D_Real and single D_Detect values for at least two laser pulse groups to solve for the Sale and Intercept parameters by using, for example, Equation (2) as shown below:

$$D\_Real = Slope * D\_Detect + Intercept \qquad \text{Equation (2)}$$

Since each camera operates within a range of distances, the calibration module 330 obtains at least two D_Real values and at least two D_Detect values to calculate the slope and intercept parameters for each camera. For example, if a first camera captures images from 5 meters to 50 meters, and a second camera captures images from 50 meters to 200 meters, then the laser emitter can generate and emit a laser pulse group at each of the following exemplary distances: 10 meters, 20 meters, 70 meters, and 120 meters. In this example, the laser receiver module 320 provides a first D_Real value for laser pulse group emitted at 10 meters and a second D_Real value for laser pulse group emitted at 20 meters, and the camera module 325 provides a first D_Detect value for a laser pulse group emitted at 10 meters and a second D_Detect value for laser pulse group emitted at 20 meters. Similarly, the laser receiver module 320 and the camera module 325 also provide two D_Real values for the laser pulse group emitted at 70 meters and 120 meters and two D_Detect values for the laser pulse group emitted at 70 meters and 120 meters. The calibration module 330 can use the two D_Real values and two D_Detect values for each set of two or more distances within an imaging range of each camera (e.g., 10 meters and 20 meters for the first camera) to solve for the intercept and slope parameters for each camera (e.g., the first camera). For example, the calibration module 330 can use the two D_Real values and two D_Detect values for the laser pulse groups emitted at 10 meters and 20 meters to solve for the intercept and slope parameters for the first camera using Equation (2).

In some embodiments, a non-linear equation such as an n-th order polynomial can be used to determine the slope and intercept values based on n-number of D_Real and D_Detect values, where n is greater than or equal to two. The n-number of D_Real and D_Detect values can be obtained from n-number of laser pulse groups each comprising one or more laser spots. In some embodiments, as explained in this patent document, a simplified linear equation can be used (e.g., Equation (2)) to determine the slope and intercept values based on at least two D_Real and D_Detect values.

After the calibration module 330 obtains the intercept and slope parameters for the cameras on the vehicle, the distance module 335 can determine distances from the vehicle to one or more objects located in an environment that surrounds the vehicle as the vehicle is being driven to its destination. The distance module 335 can use the slope and intercept parameters of a camera when determining a distance of an object located in an image obtained from the camera.

Figure 4:
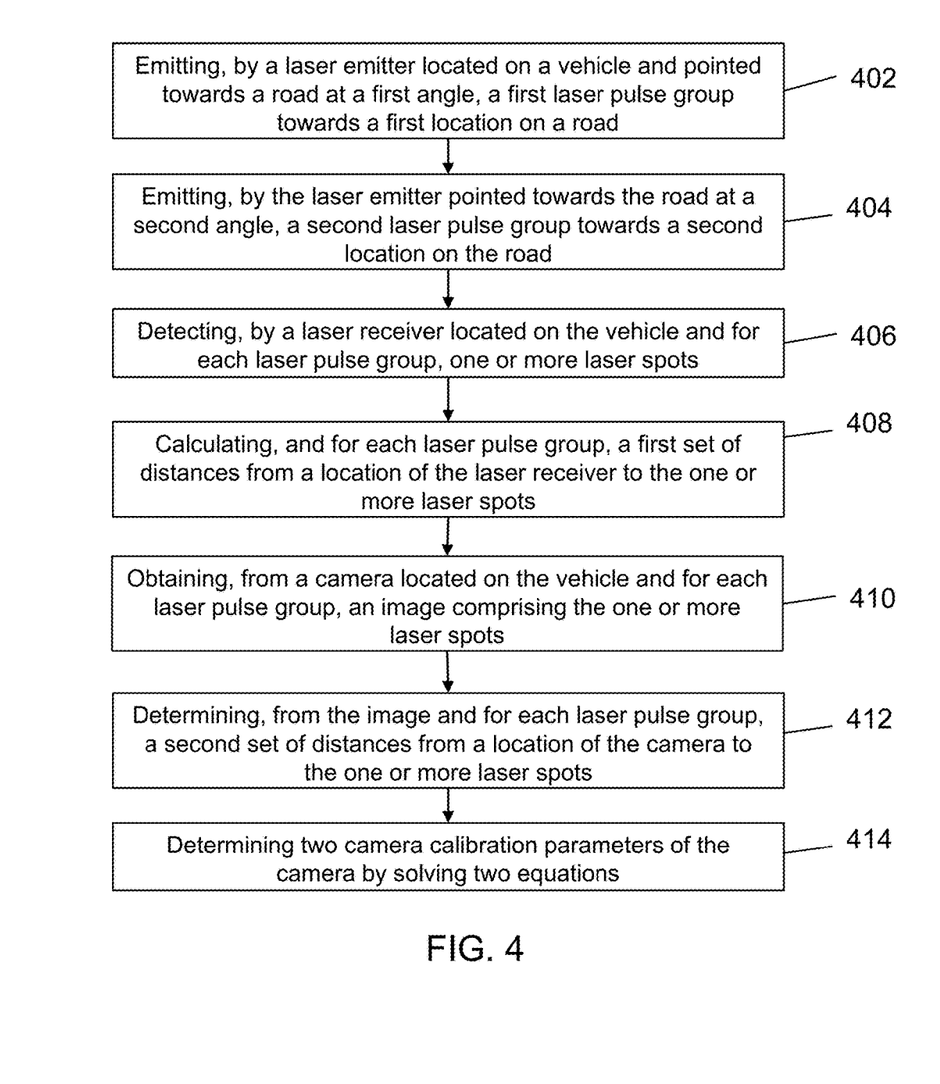
FIG. 4 shows an exemplary flow diagram of performing camera calibration.

FIG. 4 shows an exemplary flow diagram of performing camera calibration. At the first emitting operation 402, a laser emitter located on a vehicle and pointed towards a road at a first angle emits a first laser pulse group towards a first location on a road. At the second emitting operation 404, the laser emitter pointed towards the road at a second angle emits a second laser pulse group towards a second location on the road. Each of the first laser pulse group and the second laser pulse group comprises one or more laser spots.

Operations 406 to 412 are performed for each of the first laser pulse group and the second laser pulse group emitted at the first location and the second location, respectively. At the detecting operation 406, a laser receiver located on the vehicle detects the one or more laser spots. At the calculating operation 408, a first set of distances from a location of the laser receiver to the one or more laser spots are calculated. At the obtaining operation 410, an image comprising the one or more laser spots is obtained from a camera located on the vehicle. At the determining operation 412, a second set of distances from a location of the camera to the one or more laser spots are determined from the image At the determining operation 414, two camera calibration parameters of the camera are determined by solving two equations. Each equation includes two unknown camera calibration parameters, and a first value associated with the first set of distances and a second value associated with the second set of distances for a same laser pulse group.

In some embodiments, the determining the two camera calibration parameters comprises determining a slope value and an intercept value by determining, for both the first laser pulse group and the second laser pulse group, a first average distance of the first set of distances and a second average distance of the second set of distances, where the first value is the first average distance and the second value is the second average distance, and by determining, by solving two linear equations, the slope value and the intercept value with which the camera is calibrated, where a first linear equation includes an unknown slope value, an unknown intercept value, and the first average distance and the second average distance corresponding to the first laser pulse group, and where a second linear equation includes the unknown slope value, the unknown intercept value, and the first average distance and the second average distance corresponding to the second laser pulse group.

In some embodiments, the method of FIG. 4 further includes determining, while the vehicle is being driven, a location of an object in another image obtained from the camera by using the slope value and intercept value of the camera.

In some embodiments, the first location is located at a first pre-determined distance along the road from a location of the laser emitter, and the second location is located at a second pre-determined distance along the road from the location of the laser emitter. In some embodiments, the first pre-determined distance and the second pre-determined distance are within a range of distances from a location of the camera at which the camera is configured to obtain the images.

In some embodiments, the method of FIG. 4 further includes determining the first angle and the second angle formed in between a direction in which the laser emitter is pointed towards the road and an imaginary horizontal plane that is at least partly parallel to the road and that includes at least a portion of the laser emitter, and adjusting the laser emitter according to each of first angle and the second angle to emit the first laser pulse group and the second laser pulse group at the first pre-determined distance and the second pre-determined distance, respectively. In some embodiments, each of first pre-determined distance and the second pre-determined distance is a distance from the location of the laser emitter to at least one laser spot of the one or more laser spots.

In some embodiments, each of the first laser pulse group and the second laser pulse group is emitted for a pre-determined time duration. In some embodiments, the pre-determined time duration is greater than a reciprocal of a frame rate of the camera.

In some embodiments, the detecting the one or more laser spots and the calculating the first set of distances comprises: receiving, from the laser receiver, signals indicative of times when the one or more laser spots are detected, calculating, for each laser spot, a distance from the laser receiver to a laser spot by: obtaining a time delay value by subtracting a first time of detection of the laser spot from a second time when a laser pulse group that included the one or more laser spots was emitted, and multiplying the time delay value by one-half of a speed of light.

In some embodiments, the first laser pulse group and the second laser pulse group are emitted when the vehicle is stopped or parked on the road. In some embodiments, the camera is located adjacent to the laser receiver.

In some implementations, methods described in the various embodiments in this patent document are embodied in a computer readable program stored on a non-transitory computer readable media. The computer readable program includes code that when executed by a processor, causes the processor to perform the methods described in this patent document, including the method described in FIG. 3. In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of performing camera calibration, comprising:

emitting, by a laser emitter located on a vehicle and pointed towards a road at a first angle, a first laser pulse group towards a first location on a road;

emitting, by the laser emitter pointed towards the road at a second angle, a second laser pulse group towards a second location on the road, wherein each of the first laser pulse group and the second laser pulse group comprises one or more laser spots;

wherein the first laser pulse group and the second laser pulse group are emitted at the first location and the second location, respectively;

determining two camera calibration parameters of a camera by solving two predetermined equations, wherein each predetermined equation includes two unknown camera calibration parameters, and a first value associated with a first set of distances to the one or more laser spots and a second value associated with a second set of distances to the one or more laser spots for a same laser pulse group;

determining, based on a speed at which the vehicle is moving, the first angle and the second angle formed in between a direction in which the laser emitter is pointed towards the road and an imaginary horizontal plane that is at least partly parallel to the road and that includes at least a portion of the laser emitter;

adjusting the laser emitter according to each of the first angle and the second angle to emit the first laser pulse group and the second laser pulse group at the first pre-determined distance and the second pre-determined distance, respectively; and determining the two camera calibration parameters of the camera while the vehicle is moving.

2. The method of claim 1, wherein determining the two camera calibration parameters comprises determining a slope value and an intercept value by:

determining, for both the first laser pulse group and the second laser pulse group, a first average distance of the first set of distances and a second average distance of the second set of distances, wherein the first set of distances are determined between a laser receiver and the one or more laser spots and the second set of distances are determined between the camera and the one or more laser spots;

wherein the first value is the first average distance and the second value is the second average distance; and determining, by solving the two predetermined linear equations, the slope value and the intercept value with which the camera is calibrated, wherein the first predetermined linear equation includes an unknown slope value, an unknown intercept value, and the first average distance and the second average distance corresponding to the first laser pulse group, and wherein the second predetermined linear equation includes the unknown slope value, the unknown intercept value, and the first average distance and the second average distance corresponding to the second laser pulse group.

3. The method of claim 2, further comprising:
determining, while the vehicle is being driven, a location of an object in another image obtained by using the slope value and intercept value of the camera.

4. The method of claim 1,
wherein the first location is located at a first pre-determined distance along the road from a location of the laser emitter, and
wherein the second location is located at a second pre-determined distance along the road from the location of the laser emitter.

5. The method of claim 4, wherein the first pre-determined distance and the second pre-determined distance are within a range of distances from a location of the camera at which the camera is configured to obtain the images.

6. The method of claim 4, further comprising:
determining the first angle and the second angle formed in between a direction in which the laser emitter is pointed towards the road and an imaginary horizontal plane that is at least partly parallel to the road and that includes at least a portion of the laser emitter; and
adjusting the laser emitter according to each of first angle and the second angle to emit the first laser pulse group and the second laser pulse group at the first pre-determined distance and the second pre-determined distance, respectively.

7. The method of claim 4, wherein each of the first pre-determined distance and the second pre-determined distance is a distance from the location of the laser emitter to at least one laser spot of the one or more laser spots.

8. The method of claim 1, further comprising:
detecting, by a laser receiver located on the vehicle, the one or more laser spots;
receiving, from the laser receiver, signals indicative of times when the one or more laser spots are detected; and
calculating, for each laser spot, a distance from the laser receiver to a laser spot by:
obtaining a time delay value by subtracting a first time of detection of the laser spot from a second time when a laser pulse group that included the one or more laser spots was emitted; and
multiplying the time delay value by one-half of a speed of light.

9. The method of claim 1, wherein the first laser pulse group and the second laser pulse group are emitted when the vehicle is stopped or parked on the road.

10. The method of claim 1, further comprising, for each of the first laser pulse group and the second laser pulse group emitted at the first location and the second location, respectively:
comparing the obtained image to a set of previous images of the one or more laser spots at various pre-determined distances from a location of the laser emitter; and
determining the second set of distances from the location of the camera to the one or more laser spots based on the comparison of the obtained image to the set of previous images.

11. A computer readable program stored on a non-transitory computer readable media, the computer readable program including code that when executed by a processor, causes the processor to:

instruct a laser emitter located on a vehicle to point towards a road at a first angle and emit a first laser pulse group towards a first location on a road;
instruct the laser emitter to point towards the road at a second angle and emit a second laser pulse group towards a second location on the road, wherein each of the first laser pulse group and the second laser pulse group comprises one or more laser spots;
wherein the first laser pulse group and the second laser pulse group are emitted at the first location and the second location, respectively;
determine two camera calibration parameters of a camera by solving two predetermined equations, wherein each predetermined equation includes two unknown camera calibration parameters, and a first value associated with a first set of distances to the one or more laser spots and a second value associated with a second set of distances to the one or more laser spots for a same laser pulse group;
determine, based on a speed at which the vehicle is moving, the first angle and the second angle formed in between a direction in which the laser emitter is pointed towards the road and an imaginary horizontal plane that is at least partly parallel to the road and that includes at least a portion of the laser emitter;
adjust the laser emitter according to each of first angle and the second angle to emit the first laser pulse group and the second laser pulse group at the first pre-determined distance and the second pre-determined distance, respectively; and
determine the two camera calibration parameters of the camera while the vehicle is moving.

12. The computer readable program of claim 11, wherein the code, when executed by the processor, causes the processor to determine the two camera calibration parameters, wherein the two camera calibration parameters comprise a slope value and an intercept value, by:
determining, for both the first laser pulse group and the second laser pulse group, a first average distance of the first set of distances and a second average distance of the second set of distances, wherein the first set of distances are determined between a laser receiver and the one or more laser spots and the second set of distances are determined between the camera and the one or more laser spots;
wherein the first value is the first average distance and the second value is the second average distance; and
determining, by solving the two predetermined linear equations, the slope value and the intercept value with which the camera is calibrated,
wherein the first predetermined linear equation includes an unknown slope value, an unknown intercept value, and the first average distance and the second average distance corresponding to the first laser pulse group, and
wherein the second predetermined linear equation includes the unknown slope value, the unknown intercept value, and the first average distance and the second average distance corresponding to the second laser pulse group.

13. The computer readable program of claim 12, wherein the code, when executed by the processor, causes the processor to:
determine, while the vehicle is being driven, a location of an object in another image obtained from the camera by using the slope value and intercept value of the camera.

14. The computer readable program of claim 11,
wherein the first location is located at a first pre-determined distance along the road from a location of the laser emitter, and
wherein the second location is located at a second pre-determined distance along the road from the location of the laser emitter.

15. The computer readable program of claim 14, wherein the first pre-determined distance and the second pre-determined distance are within a range of distances from a location of the camera at which the camera is configured to obtain the images.

16. The computer readable program of claim 14, wherein the code, when executed by the processor, causes the processor to:
determine the first angle and the second angle formed in between a direction in which the laser emitter is pointed towards the road and an imaginary horizontal plane that is at least partly parallel to the road and that includes at least a portion of the laser emitter; and
adjust the laser emitter according to each of first angle and the second angle to emit the first laser pulse group and the second laser pulse group at the first pre-determined distance and the second pre-determined distance, respectively.

17. The computer readable program of claim 14, wherein each of the first pre-determined distance and the second pre-determined distance is a distance from the location of the laser emitter to at least one laser spot of the one or more laser spots.

18. The computer readable program of claim 11, wherein each of the first laser pulse group and the second laser pulse group is emitted for a pre-determined time duration, wherein the pre-determined time duration is greater than a reciprocal of a frame rate of the camera.

19. The computer readable program of claim 11, wherein the code, when executed by the processor, causes the processor to:
detect, by a laser receiver located on the vehicle, the one or more laser spots;
receive, from the laser receiver, signals indicative of times when the one or more laser spots are detected;
calculate, for each laser spot, a distance from the laser receiver to a laser spot by:
obtaining a time delay value by subtracting a first time of detection of the laser spot from a second time when a laser pulse group that included the one or more laser spots was emitted; and
multiplying the time delay value by one-half of a speed of light.

20. The computer readable program of claim 11, wherein the code, when executed by the processor, causes the processor to, for each of the first laser pulse group and the second laser pulse group emitted at the first location and the second location, respectively:
compare the obtained image to a set of previous images of the one or more laser spots at various pre-determined distances from a location of the laser emitter; and
determine the second set of distances from the location of the camera to the one or more laser spots based on the comparison of the obtained image to the set of previous images.

* * * * *